R. A. BONHAM.
ELECTRICALLY CONTROLLED TRANSMISSION MECHANISM.
APPLICATION FILED JUNE 12, 1918.
1,311,748.
Patented July 29, 1919.
5 SHEETS—SHEET 1.
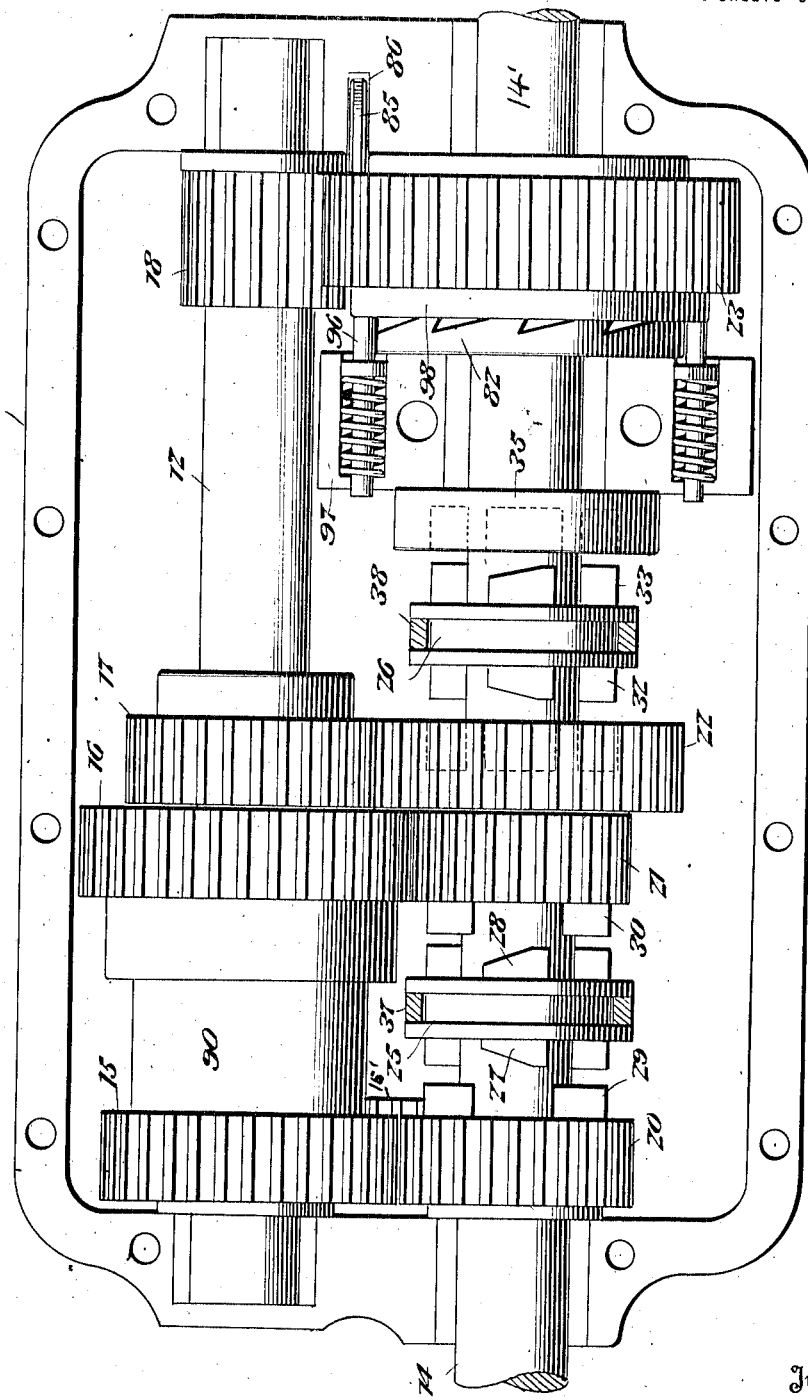
Witnesses
Inventor
R. A. Bonham
By Victor J. Evans
Attorney R. A. BONHAM.
ELECTRICALLY CONTROLLED TRANSMISSION MECHANISM.
APPLICATION FILED JUNE 12, 1913.
1,311,748.
Patented July 29, 1919.
5 SHEETS—SHEET 2.
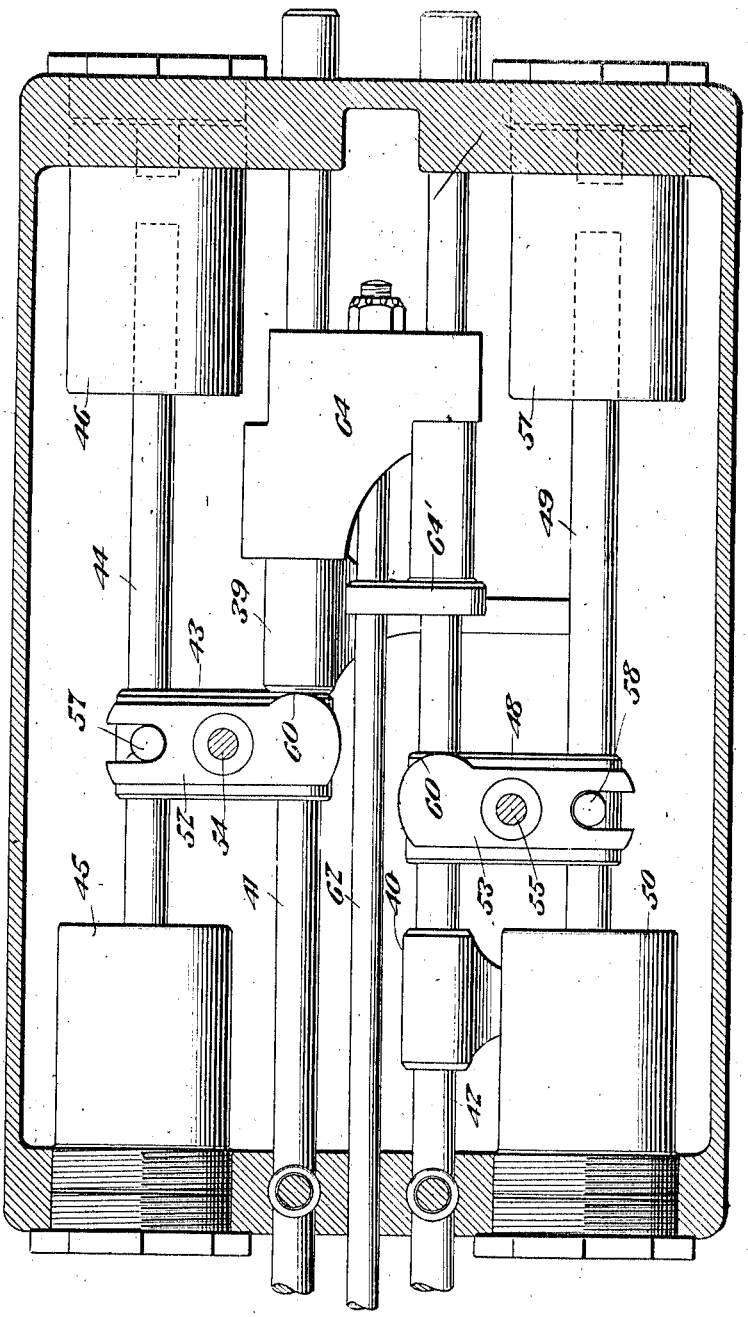

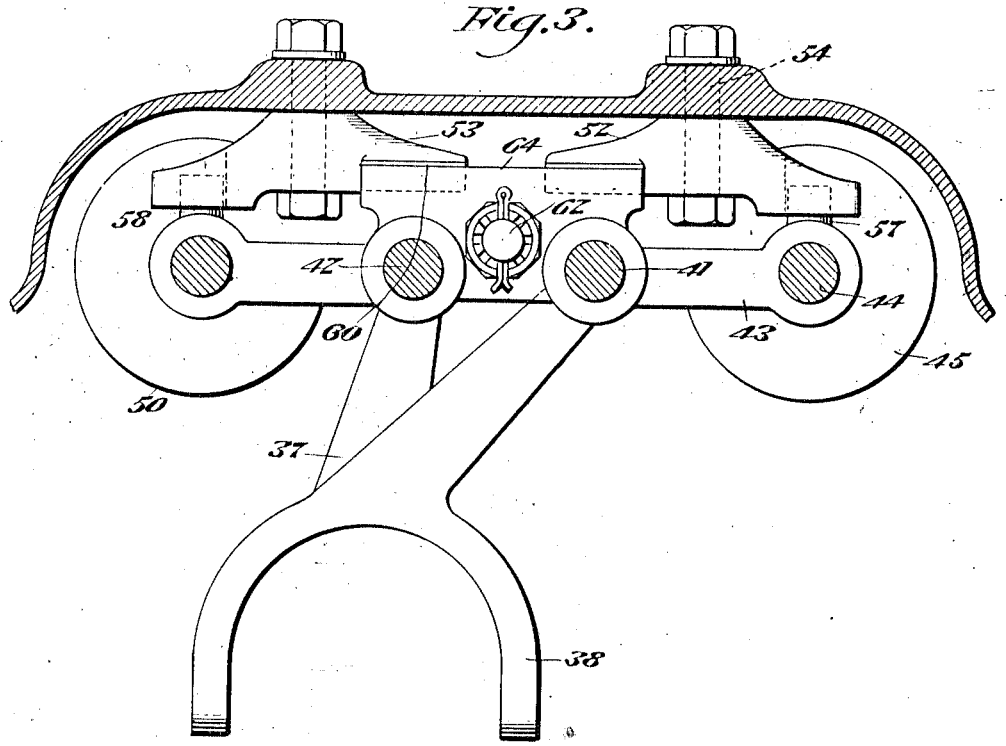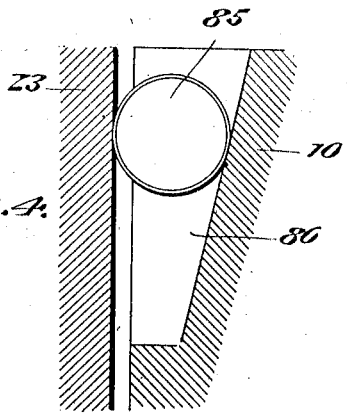

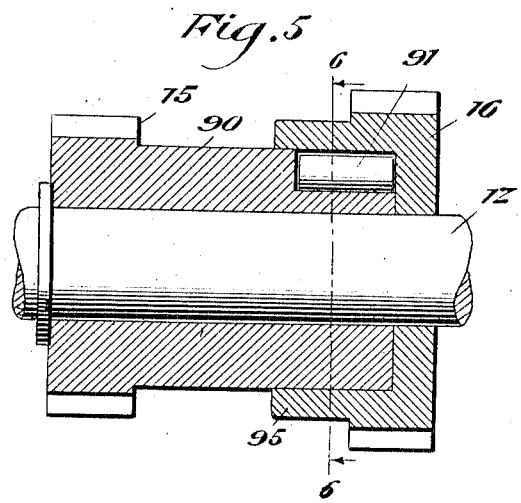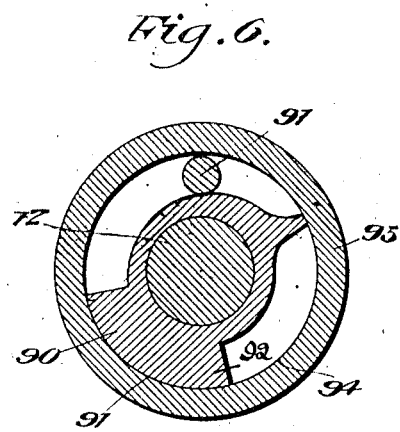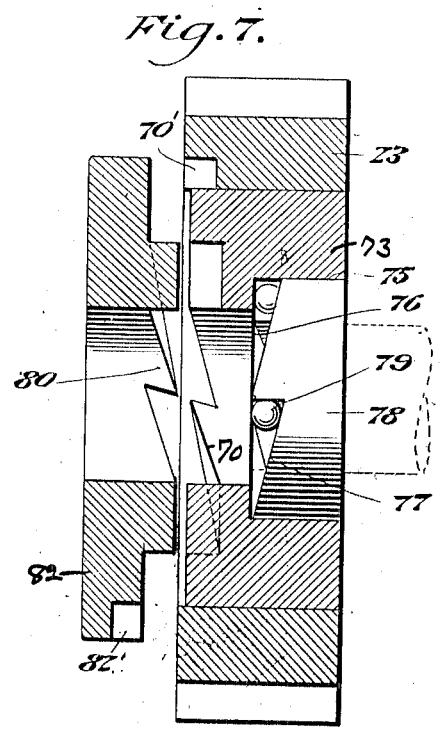

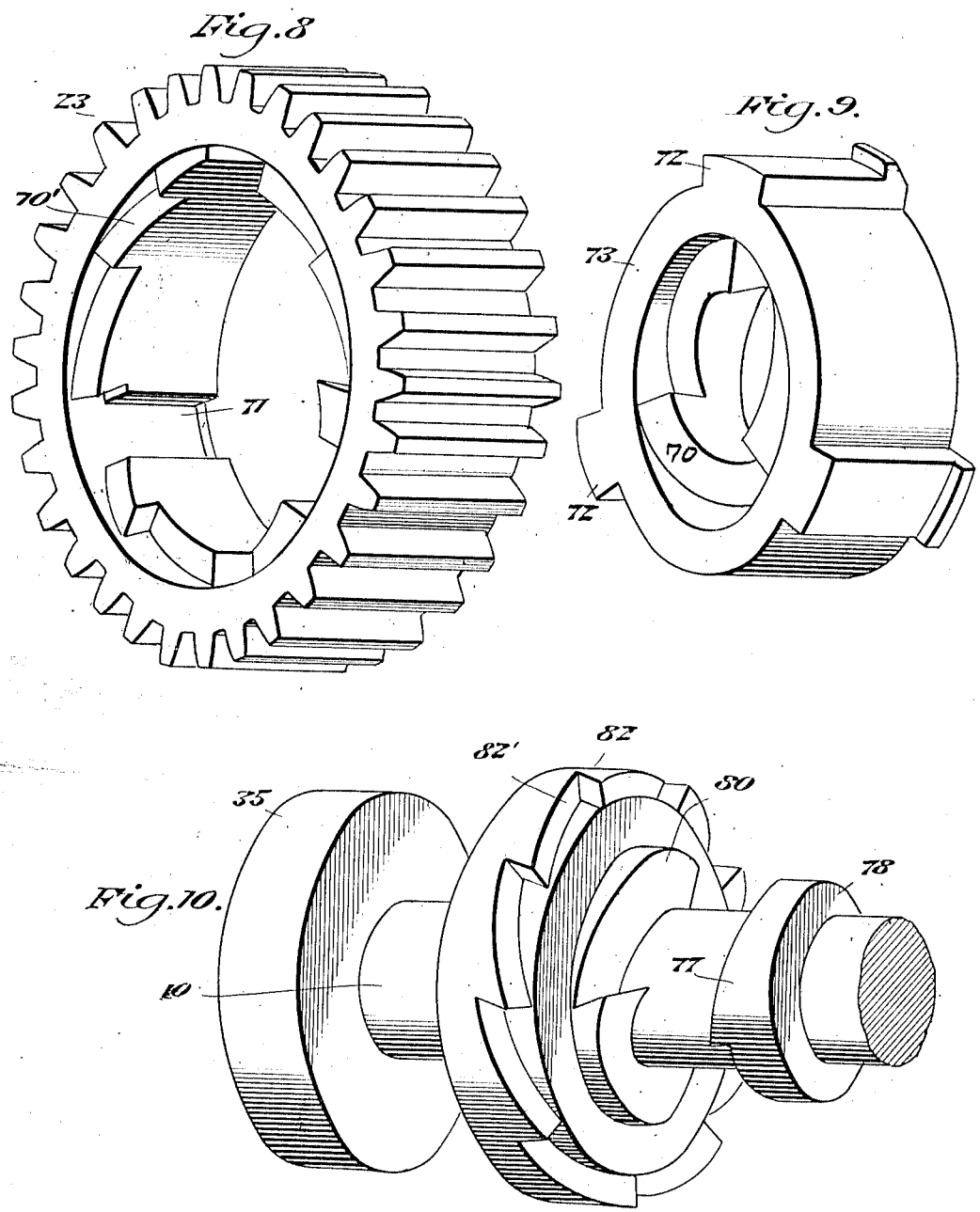

UNITED STATES PATENT OFFICE.

ROY A. BONHAM, OF SPRINGFIELD, MISSOURI.

ELECTRICALLY-CONTROLLED TRANSMISSION MECHANISM.

1,311,748.     Specification of Letters Patent.     Patented July 29, 1919.

Application filed June 12, 1918. Serial No. 239,627.

*To all whom it may concern:*

Be it known that I, ROY A. BONHAM, a citizen of the United States, residing at Springfield, in the county of Greene and State of Missouri, have invented new and useful Improvements in Electrically-Controlled Transmission Mechanism, of which the following is a specification.

This invention relates to electrically controlled transmission mechanism, and one object is to provide an improved construction whereby the drive at high speed is directly from the driving element to the driven element, independent of the gears.

A further object is to provide improved means for shifting the clutch members by electrically operated devices.

A still further object is to provide a construction in which the gear wheels of each pair are always in mesh, and the disadvantages resulting from the shifting of the gears proper is avoided.

A still further object is to provide means whereby the necessary speed changes may be effected by an inexperienced operator as well as by an experienced driver, and may also be effected with a minimum amount of current for operating the solenoids.

A still further object is to provide improved means for effecting the reverse, the reversing gears being stationary under normal conditions.

A still further object is to provide certain means of novel construction for effecting the control of the gear wheels directly imparting motion to the driven shaft.

With the foregoing and other objects in view, the invention consists in the novel construction, combination, and arrangement of elements hereinafter described and claimed.

In the drawings,

Figure 1 is a plan view of the gearing and clutches,

Fig. 2 is a plan view of the electrical and mechanical devices for controlling the clutches, the casing being in horizontal section, Fig. 3 is a vertical transverse section through the structure of Fig. 2, the solenoid cores and the yokes being in elevation, Fig. 4 is a detail showing a disk member operating in a tapered channel for shifting the position of one of the gear wheels on its shaft, in effecting the reverse, Fig. 5 is a section through the roller clutch mechanism permitting the reverse gear wheels to remain stationary during the forward drive, Fig. 6 is a section on line 6—6 of Fig. 5, Fig. 7 is a section through the gear wheel at the lower right hand portion of Fig. 1, and showing the clutch elements associated with said gear wheel, Figs. 8, 9 and 10 are perspective views showing the elements of Fig. 7 detached.

In carrying out my invention, I provide a casing 10 of any suitable construction and mount therein a counter-shaft 12, the main shaft being designated 14. The counter-shaft carries rigidly a plurality of gear wheels designated at 15, 16, 17 and 18, and the main shaft carries loosely mounted thereon a plurality of gear wheels, one of which designated 20, and effects the reverse, gear wheels 21 and 22 controlling the first and second speeds respectively, a gear wheel 23 meshing with gear wheel 18 and being mounted as hereinafter described.

Carried by the main shaft are a plurality of slidable clutch members designated 25 and 26, the clutch member 25 having a series of teeth 27 on one side and a series of teeth 28 on the opposite side, the series first mentioned engaging the teeth 29 on reverse gear 20, and the series of teeth 28 engaging the teeth 30 on gear wheel 21. The clutch member 26 is also provided with two series of teeth, one of these being designated 32, and having engagement, when the clutch member is thrown toward the left as shown in Fig. 1, with gear wheel 22, the other series of teeth 33 having engagement, when the clutch member 26 is thrown in the opposite direction, with the member 35 carried by the shaft 14'.

The clutch members 25 and 26 are under the control of yokes, one of these yokes being designated 37 and the other being shown at 38. These yokes are rigidly connected with sleeves 39 and 40 respectively and the sleeves are controlled in part by slidable rods 41 and 42. The rod 41 is connected by a transverse member 43 with a rod 44 constituting the core of a plurality of solenoids shown at 45 and 46, whereby the position of the yokes and, therefore, of the slidable clutch member 26 is controlled in part. The other of said clutch members is under the control of slidable member or rod 42 connected rigidly with a transverse member 48 and with a reciprocable rod 49 projecting at its ends into solenoids 50 and 51.

A plurality of pivotally mounted plate members 52 and 53 are supported by pins or bolts 54 and 55 projecting from the upper portion of the casing, these plate members each being slotted at one end, the slotted portion engaging pins 57 and 58 carried by connecting members 43 and 48. Each plate 52 or 53 is provided with a rounded portion 60 engaged as indicated below for operating the plate members and causing their slotted portions to throw the rods 44 and 49 longitudinally in view of the engagement with pins 57 and 58, for restoring elements 44 and 49 to normal position.

A rod 62 between slidable rods 41 and 42 is controlled by means of the main clutch pedal, for operating a slidable member 64 movable on rods 41, 42, and engaging transverse member 43 for throwing yoke 38 to neutral position. Transverse member 48 and yoke 37 are similarly operated by the element 64' operating with slide 64. Pivoted plates 52, 53, are operated at the same time and in the same manner for restoring rods 44 and 49 constituting the cores of the solenoids.

The gear wheel 23 is provided with a series of teeth 70' and with a plurality of channels 71, the latter being engaged by the projecting members 72 of a clutch core 73 carried loosely on the driven shaft 14'. This clutch core 73 is provided with an annular recess 75 having a plain wall 76 located opposite the toothed portion 77 of clutch member 78 rigidly carried by shaft 14'. Balls 79 are located in the spaces between the teeth 77 and the plain surface 76 of clutch core 73. When the core is rotated in one direction by virtue of the rotation of gear wheel 23, the balls 79 are inactive, but when gear wheel 23 rotates in the opposite direction, the balls tend to move toward the narrow portions of the spaces between the series of teeth 77 and the plain surface 76, thereby throwing the clutch core 73 toward the left as shown in Fig. 7 and throwing the teeth 70 into engagement with the series of teeth 80 for driving the clutch element 82 and imparting motion to the driven shaft 14' in a forward direction.

When the movement of the gears is retarded upon throwing out the clutch, core 73 and gear wheel 23 tend to recede from member 82, the balls 79 assuming their neutral position, or the position shown in Fig. 7.

The foregoing provides for the first and second speeds.

In order to secure the reverse, the clutch member 25 is thrown toward the left by the energization of the solenoid 50 causing the rotation of gear wheels 20 and 15, through idler 15', the rotation of countershaft 12, gear wheel 18, and gear wheel 23. The gear wheel last named is engaged by a disk 85 mounted within a tapered channel 86, and the rotation of wheel 23 in the reverse direction causes the movement of said gear wheel toward the left as shown in Fig. 7, in view of the engagement between the disk and the tapered wall of channel 86. Upon throwing gear wheel 23 toward the left the series of teeth 70' mesh with the series 82' on clutch member 82, carried rigidly by shaft 14'. The shaft last named is then driven in a reverse direction.

The solenoid 46 controls the third speed, throwing clutch member 26 toward the right and causing its teeth 33 to engage the member 35 carried rigidly by shaft 14' thereby effecting a direct drive, all of the gear wheels remaining stationary.

Reverse gear wheel 15 is formed with a hub portion or core 90 cut away in the manner shown in Fig. 6, providing a surface permitting the roller 91 to move eccentrically with reference to shaft 12.

A weighted portion 92 limits the movement of the roller 91 in one direction, holds gear wheel 15 normally stationary, and affords a cam surface providing a wedging action, whereby the core 90 positively engages bore 94 of sleeve 95 carried by the gear wheel 16 when effecting the reverse. These elements are free in the opposite direction, and allow the reverse gears to remain stationary during the forward drive at any speed.

Pins 96, resiliently mounted in bearing member or journal 97 press against a ring member 98 carried by gear wheel 23 and retain the latter and its core in neutral position, the spring-held pins yielding however under the action of disk 85 in effecting the reverse drive.

The solenoids are controlled by suitable mechanism within reach of the driver of the car, permitting the solenoids to be energized separately and selectively.

What is claimed is:

1. In a device of the class described, the main shaft, a plurality of gear wheels loosely mounted thereon, a driven shaft, a counter-shaft and a plurality of gear wheels rigidly mounted thereon, and means for rotating the driven shaft directly from the main shaft and rotating the driven shaft from the main shaft through the counter-shaft, said means including a gear wheel and a core therefor on the driven shaft and devices for effecting rotation of the driven shaft through the gear wheel and core and independently of the core.

2. In a device of the class described, a main shaft, a plurality of gear wheels loosely mounted thereon, a driven shaft, a counter-shaft and a plurality of gear wheels rigidly mounted thereon, and means for rotating the driven shaft directly from the main shaft and rotating the driven shaft from the main shaft through the counter-shaft, said means including a clutch core slidable on the driven shaft, a gear wheel rotatable with the core and slidable thereon, and a clutch element on the driven shaft with series of teeth reversely arranged and engaged independently by the core or by the gear wheel.

3. In a device of the class described, a main shaft, a plurality of gear wheels loosely mounted thereon, a driven shaft, a counter-shaft and a plurality of gear wheels rigidly mounted thereon, and means for rotating the driven shaft directly from the main shaft and rotating the driven shaft from the main shaft through the counter-shaft, said means including a clutch core slidable on the driven shaft, a gear wheel rotatable with the core and slidable thereon, and a clutch element on the driven shaft with series of teeth reversely arranged and engaged independently by the core or by the gear wheel, and electrically and mechanically operated means for causing the gear wheels on the main shaft to rotate therewith.

4. In a device of the class described, a main shaft, a plurality of gear wheels loosely mounted thereon, a plurality of clutch members slidable on the shaft and each provided with teeth on opposite faces thereof, certain of the gear wheels being located on opposite sides of one of the clutch members, and being provided with engaging devices coöperating with the clutch members, another of said gear wheels being located on said shaft and constructed for engagement by the other of said clutch members, a driven shaft, means carried thereby constructed to be engaged by said clutch member last named, upon the opposite side thereof, a counter-shaft, a plurality of gear wheels rigidly carried thereby, each of said wheels constantly meshing with one of the wheels on the main shaft, a gear wheel and means for mounting the latter on the driven shaft, said gear wheel last named meshing with one of the gear wheels on the counter-shaft, the mounting means for the gear wheel on the driven shaft including a core, and means for placing the core in engagement with the driven shaft when the core is rotated in one direction.

5. In a device of the class described, a main shaft, a plurality of gear wheels loosely mounted thereon, a plurality of clutch members slidable on the shaft and each provided with teeth on opposite faces thereof, certain of the gear wheels being located on opposite sides of one of the clutch members, and being provided with engaging devices coöperating with the clutch members, another of said gear wheels being located on said shaft and constructed for engagement by the other of said clutch members, a driven shaft, means carried thereby constructed to be engaged by said clutch member last named, upon the opposite side thereof, a counter-shaft, a plurality of gear wheels rigidly carried thereby, each of said wheels constantly meshing with one of the wheels on the main shaft, a gear wheel and means for mounting the latter on the driven shaft, said gear wheel last named meshing with one of the gear wheels on counter-shaft, the mounting means for the gear wheel on the driven shaft including a core, and means for placing the core in engagement with the driven shaft when the core is rotated in one direction, and means for shifting said gear wheel last named for causing the latter to rotate the driven shaft in a reverse direction.

6. In a device of the class described, a main shaft, a counter-shaft, a plurality of pairs of continuously meshing gear wheels carried by the shafts, means for driving each pair of gear wheels from the main shaft independently of the others, a driven shaft, a slidable clutch core thereon rotatable with one of the gear wheels, a rigid clutch element on the driven shaft having two sets of teeth reversely arranged, means for shifting the core longitudinally for engaging one of said series of teeth and comprising a plurality of balls bearing against a fixed element on the driven shaft having inclined walls, said balls bearing against one face of the core, and a disk member engaging one face of the gear wheel last named, and causing engagement between the gear wheel and the other series of teeth on the rigid clutch element of the driven shaft.

7. In a device of the class described, a main shaft, a plurality of gear wheels loosely mounted thereon, a driven shaft, a counter shaft and a plurality of gear wheels thereon, and means for rotating the driven shaft directly from the main shaft and rotating the driven shaft from the main shaft through the counter shaft, said means including a clutch core slidable on the driven shaft, a gear wheel rotatable with the core and slidable thereon, a clutch element on the driven shaft with series of teeth reversely arranged and engaged independently by the core or by the gear wheel last named, and a device for automatically shifting the gear wheel last named to the series of teeth effecting the reverse drive.

8. In a device of the class described, a main shaft, a driven shaft, a counter shaft, and gear wheels mounted on said shafts, one of the gear wheels being carried by the driven shaft, a clutch core slidable on the driven shaft, a gear wheel rotatable with the core and slidable thereon, a clutch element on the driven shaft with series of teeth reversely arranged, and engaged independently by the core or by the gear wheel last named, and a disk movable in a tapered channel engaging the gear wheel last named, for shifting the latter in one direction.

In testimony whereof I affix my signature.

ROY A. BONHAM.